United States Patent [19]

Heinzer et al.

[11] 4,453,635
[45] Jun. 12, 1984

[54] OPTICAL FIBER COIL STORAGE ARRANGEMENT AND A METHOD OF MANUFACTURING THE SAME

[75] Inventors: Hans E. Heinzer, Roanoke; Donald L. Taylor, Salem, both of Va.

[73] Assignee: International Telephone and Telegraph Corporation, New York, N.Y.

[21] Appl. No.: 412,736

[22] Filed: Aug. 30, 1982

[51] Int. Cl.³ .................... B65D 85/66; B65D 85/67
[52] U.S. Cl. .................................. 206/408; 53/396; 206/524
[58] Field of Search .............. 206/524, 408, 397, 398, 206/407, 413; 53/452, 396

[56] References Cited

U.S. PATENT DOCUMENTS

| | | | |
|---|---|---|---|
| 3,394,797 | 7/1968 | Flannigan | 206/524 |
| 3,870,741 | 3/1975 | Kuhn | 206/524 |
| 4,079,835 | 3/1978 | Kendig | 206/408 |
| 4,151,914 | 5/1979 | Blatt | 206/408 |
| 4,267,927 | 5/1981 | English, Jr. | 206/524 |

Primary Examiner—Joseph Man-Fu Moy
Attorney, Agent, or Firm—John T. O'Halloran; Peter R. Ruzek

[57] ABSTRACT

An arrangement for storing a coil of optical fiber prior to and during an inner peel deployment of the optical fiber from the coil comprises an outer aluminum casing, a body of solid foam material in the interior of the casing, and a barrier sheet in the interface, between the foam body and the coil of optical fiber. The foam body is formed in situ in a confining space outwardly and axially delimited by the casing and inwardly delimited by the barrier sheet and by two end lids, by introducing the material of the body into the enclosed space through openings in the casing and letting the material foam and cure in the spacing. During the formation of the body, the coil of optical fiber is supported on a mandrel which is, in turn coaxially supported on the end lids. After the foamed material has solidified, the end lids and the mandrel can be removed and the arrangement is now ready for inner peel deployment of the optical fiber therefrom.

18 Claims, 1 Drawing Figure

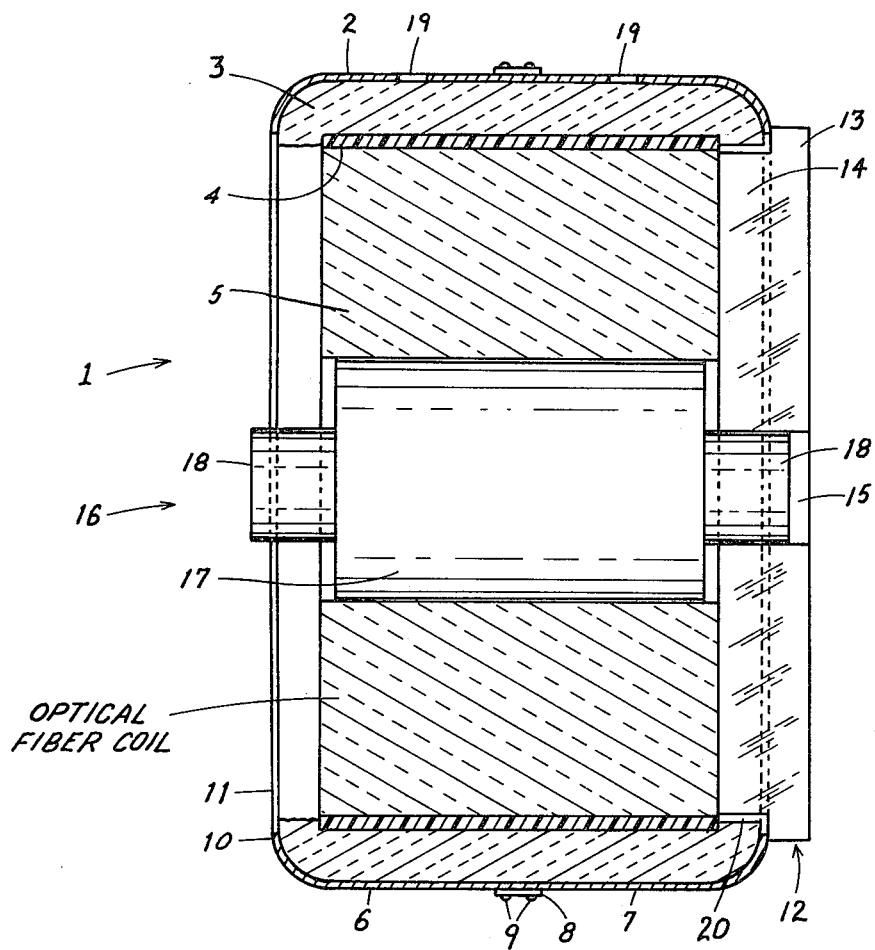

OPTICAL FIBER COIL STORAGE ARRANGEMENT AND A METHOD OF MANUFACTURING THE SAME

The Government has rights in this invention pursuant to Contract No. DAAK80-79-0803 awarded by the Department of the Army.

BACKGROUND OF THE INVENTION

The present invention relates to optical fiber storage arrangements in general, and more particularly to an arrangement for storing a coil of optical fiber prior to and during an inner peel deployment of the optical fiber from the coil, as well as to a method of manufacturing such as arrangement.

In recent times, there has been a dramatic increase in the use of optical fibers in the communication field. With increasing popularity of optical fiber cables, there is an increased demand for arrangements capable of storing the optical fiber prior to and during deployment. It will be appreciated that, because of its fragility, the optical fiber must be protected from impacts. Moreover, to achieve unproblematical deployment of the optical fiber, it must be assured that the optical fiber is payed out in as uniform a manner as possible and without undue bending or twisting of the optical fiber. It is particularly important to satisfy these conditions in military applications where the conditions are not conductive to gentle handling of the optical fiber.

It is currently customary to coil the optical fiber and to accommodate the coil of optical fiber in a canister for storage, transportation and future use. However, experience has shown that the impact-protecting and pay-out-assuring function of the conventional canisters is very limited, so that there is a pronounced need for developing an optical fiber storage arrangement which has improved properties and especially such as is suited for rapid deployment of the optical fiber therefrom, such as during the deployment of the optical fiber from a helicopter or another rapidly moving craft.

SUMMARY OF THE INVENTION

Accordingly, it is a general object of the present invention to avoid the disadvantages of the prior art.

More particularly, it is an object of the present invention to develop an arrangement for storing a coil of optical fiber, which does not possess the disadvantages of the conventional storing arrangements of this type.

Still another object of the present invention is to so construct the storage arrangement as to render it possible to rapidly deploy the optical fiber therefrom without damage or distortion.

It is yet another object of the present invention to so design the arrangement of the type here under consideration as to be able to deploy the optical fiber therefrom in its entirety.

An additional object of the present invention is to provide an arrangement of the above type which is simple in construction, inexpensive to manufacture, easy to use, and reliable in operation nevertheless.

A concomitant object of the invention is to devise a method of manufacturing the arrangement of the above type in a simple and inexpensive manner.

In pursuance of these objects and others which will become apparent hereafter, one feature of the present invention resides in an arrangement for storing a coil of optical fiber prior to and during an inner peel deployment of the optical fiber from the coil, this arrangement comprising a rigid casing centered on an axis and at least circumferentially bounding a chamber for accommodating the coil, and means for holding the coil in a substantially coaxial position in the chamber with spacing from the casing, including a solid annular member filling the spacing and having an inner surface tightly engaging the outer circumference of the coil. Advantageously, the annular member includes an annular body of synthetic plastic material, especially a semi-rigid foam, which is formed into the body within the spacing by solidifying it, after being introduced into the spacing in its initially flowable state. A barrier sheet advantageously delimits the spacing at the side of the coil to prevent penetration of the flowable material into the coil. The spacing is partially delimited by a lid which is received in an opening circumferentially bounded by a portion of the casing which extends beyond the coil. Prior to and during the solidification of the semi-rigid foam, the coil is coaxially supported in the casing by a mandrel which is, in turn, supported on the aforementioned lid. After the solidification of the semi-rigid foam, the mandrel and the lid can be removed so as to provide free access to the interior of the coil of optical fiber for inner deployment of the optical fiber from the coil. The optical fiber coil storage arrangement is ready in this state for storage, transportation and eventual deployment of the optical fiber therefrom.

BRIEF DESCRIPTION OF THE DRAWING

Above-mentioned and other features and objects of this invention will become more apparent by reference to the following description taken in conjunction with the sole FIGURE of the accompanying drawing, which is a cross sectional view of a storage arrangement according to the present invention after removal of one of the end lids therefrom.

DETAILED DESCRIPTION OF THE PREFERRED EMBODIMENT

Referring now to the drawing in detail, it may be seen that the reference numeral 1 has been used to identify an optical fiber storage and deployment arrangement according to the present invention in its entirely. The storage and deployment arrangement 1 includes a casing 2, a body 3 of semi-rigid foam, and a barrier sheet 4 which circumferentially surrounds a coil 5 of an optical fiber and separates the coil 5 from the body 3.

The coil 5 is precision wound, so that it is ready for an inner peel deployment of the optical fiber therefrom in a rapid and automatic manner. In an inner peel deployment, the optical fiber is detached, turn after turn and layer after layer, from the inner surface of the coil 5 and is payed out of the storage and deployment arrangement 1. It is to be mentioned at this juncture that, when reference is being made throughout the specification to optical fiber, this expression is intended to cover not only bare optical fiber but also, and predominantly, jacketed single optical fiber or an optical fiber cable including a plurality of coextensive optical fibers surrounded by a common jacket.

The casing 2 is shown to consist of two half shells 6 and 7 which are in abutment with one another and which are surrounded, at their region of abutment, by an annular strip 8. The strip 8 is connected to the half shells 6 and 7 by rivets or similar fasteners 9. The casing 2 is made of a sturdy material, preferably of aluminum or other metallic material. The casing 2 has two axial end portions 10, each of which bounds an opening 11. As illustrated, the end portions 10 are inwardly bent to also axially delimit an annular receiving space for the body 3.

According to the present invention, the body 3 is formed in situ in the aforementioned receiving space. To completely enclose the receiving space for the body 3 and to coaxially support the coil 5 in the interior of the casing 2 during the formation of the body 3, there are provided two lids 12, only one of which, however, is shown in the drawing. Each of the lids 12 is supported in the respective opening 11 and has an outer portion 13 having an outer diameter exceeding that of the opening 11 and an inner portion 14 fittingly received in the opening 11. Each of the lids 12 bounds a coaxial bore 15. During the formation of the body 3, the coil 5 is mounted on a mandrel 16. The mandrel 16 has a cylindrical central portion 17, having an outer diameter corresponding to the inner diameter of the coil 5, and two reduced diameter end portions 18, which project axially beyond the central portion 17, and each of which is received in the bore 15 of the respective lid 12 during the formation of the body 3. Since the openings 11, the lids 12, the bores 15, the central portion 17, and the end portions 18 are all coaxial with one another and with the casing 2 in the assembled position, they coaxially support the coil 5 in the interior of the casing 2. Also, the inner portions 14 of the lids 12 hold the coil 5 in the proper axial position by abutting the same.

At least theoretically, the enclosed space between the inner surface of the casing 2, the outer surface of the coil 5, and the outer surfaces of the inner portions 14 of the lids 12 could now be filled with the material of the body 3 in its pourable or flowable state. For this purpose, each of the half shells 6 and 7 of the casing 2 is provided with a respective filling aperture 19, through which the flowable material of the body 3 can be introduced into the enclosed space. However, the filling of the enclosed space with the material the body 3 in this state would result in penetration of the flowable material of the body 3 into the interstices between the turns of the coil 5 and/or adherence of this material at least in its cured state to the jacket material of the optical fiber of the coil 5. This means that an adhesive bond would be formed between at least the outermost layer of the coil 5 and the cured body 3. This bond would then interfere with the payout of the optical fiber from the coil 5 on approaching the inner peel region to the outermost layer of the coil 5. This is why the barrier sheet 4 is provided at least around the outer periphery of the coil 5. The barrier sheet 4 is of a material, especially of synthetic plastic material such as vinyl, which is impermeable to the material of the body 3 and is not destroyed by such material even when the latter is in its flowable state. Preferably, the material of the barrier sheet 4 is flexible so as to be able to yield under the pressure of flowable material of the body 3 without being damaged or destroyed.

Advantageously, the flowable material of the body 3 is a foamable urethane mixture which, after being introduced into the enclosed space between the casing 2, the barrier sheet 4 and the lids 12, expands and forms a foam that fills the enclosed space and eventually cures therein to form the body 3. The cured body 3 has the consistency of rigid or semi-rigid foam. After the body 3 has cured, which takes about fifteen minutes, the lids 12 and the supporting mandrel 17 can be removed, and the coil will then be supported in the interior of the casing 2 by the supporting action of the body 3. In this respect it is especially advantageous when the barrier sheet 4 is of a flexible synthetic plastic material, since the pressure of the material of the body 3 will cause a portion of the barrier sheet 4 to penetrate into the interstices between the individual turns of optical fiber at the outside of the coil 5, forming corresponding corrugations at the external surface of the barrier sheet 4, which are filled with the material of the body 3. This results in a situation where the body 3 and the barrier sheet 4 prevent any movement of the coil 5 relative to the casing 3 not only in the radial directions, but also in the axial direction, due to the presence of the interlocking corrugations of the coil 5, of the barrier sheet 4, and of the body 3.

The lids 12, or at least one of them, is preferably made of transparent material, such as the marketed under the trademark Plexiglas, so that the progress for the foaming and curing of the body 3 can be observed through the transparent lid 12. However, under these circumstances there exists the danger that the material for the body 3 could become easily bonded to the lid 12. To avoid this possibility, a barrier sheet portion 20 is positioned on the surfaces of the lid 12 which are likely to come into contact with the material of the body 3, especially at the outer circumferential surface of the inner portion 14 and the inner end face of the outer portion 13 of the lids 12. The barrier sheet portion 20 may be an extension of the barrier sheet 4, or may be separate therefrom. It is currently preferred to wrap the coil 5 in a plastic film of about 1 mil thickness, and to do the same to each of the transparent lids 12. Of course, care must be taken to avoid damage either to the barrier sheet 4 or to the barrier sheet portion 20 during the assembly of the arrangement 1.

While we have described above the principles of our invention in connection with specific apparatus, it is to be clearly understood that this description is made only by way of example and not as a limitation to the scope of our invention as set forth in the objects thereof and in the accompanying claims.

We claim:

1. An arrangement for storing a coil of optical fiber prior to and during inner peel deployment of the optical fiber from the coil, comprising
   a rigid casing centered on an axis and at least circumferentially bounding a chamber for accommodating the coil, said casing having at least one axial end portion extending axially beyond the coil and circumferentially bounding an opening for the inner peel deployment of the optical fiber therethrough; and
   means for holding said coil in a substantially coaxial position in said chamber with spacing from said casing, including a solid annular member filling said spacing and having an inner surface tightly engaging the outer circumference of the coil.

2. The arrangement as defined in claim 1, wherein said annular member includes an annular body of synthetic plastic material.

3. The arrangement as defined in claim 2, wherein said synthetic plastic material is a semi-rigid foam.

4. The arrangement as defined in claim 2, wherein said annular member further includes a barrier sheet confined between said body and the coil.

5. The arrangement as defined in claim 2, wherein said synthetic plastic material is an initially flowable material filling said spacing and solidified therein into said solid annular body.

6. The arrangement as defined in claim 5, wherein said casing has at least one filling aperture for the admission of the flowable material therethrough into said spacing.

7. The arrangement as defined in claim 5, wherein said annular member further includes a barrier sheet delimiting said spacing at the side of the coil and preventing penetration of the flowable material into the coil.

8. The arrangement as defined in claim 7; and further comprising means for closing said opening and at least axially delimiting said spacing at least during the admission of said flowable material into said spacing and its solidification, including at least one lid received in said opening.

9. The arrangement as defined in claim 8, wherein said lid is of a material permeable to ligut to permit observation of the progress of formation of said annular body.

10. The arrangement as defined in claim 8, and further comprising a covering sheet portion which covers that zone of said lid which delimits said spacing during the presence of said lid in said opening.

11. The arrangement as defined in claim 5, and further comprising means for coaxially supporting the coil in said chamber at least until said annular body is fully solidified, including a support mandrel coaxially supported on said casing.

12. The arrangement as defined in claim 11; and wherein said supporting means further includes at least one lid received in said opening and coaxially supporting said support mandrel.

13. The arrangement as defined in claim 12, wherein said casing has another axial end portion axially spaced across the coil from said one end portion and circumferentially bounding an additional opening; wherein said supporting means further includes an additional lid received in said additional opening; and wherein said support mandrel is additionally supported on said additional lid.

14. The arrangement as defined in claim 13, wherein at least said one lid and said support mandrel are removable from said opening and said chamber subsequent to the solidification of said body to provide access to the inner surface of the coil for peeling of the optical fiber therefrom.

15. A method for producing an arrangement for storing a coil of optical fiber prior to and during inner peel deployment of the optical fiber from the coil, comprising the steps of providing a rigid casing centered on an axis and at least circumferentially bounding a chamber for accommodating the coil with at least one filling aperture communicating the exterior of the casing with the chamber and with at least one axial opening dimensioned for a coaxial passage of the coil therethrough into the chamber;

coaxially supporting the coil in the chamber with spacing from the casing, including mounting the coil on a mandrel, introducing the mandrel and the coil into the chamber, and supporting the mandrel on at least one lid received in the axial opening; and filling the spacing through the filling aperture with a body of initially flowable synthetic plastic material which subsequently solidifies in the spacing to form a solid body that leaves the axial opening unobstructed for deployment of the optical fiber therethrough.

16. The method as defined in claim 15, wherein said filling step includes introducing a quantity of a foamable synthetic plastic material into the spacing for foaming therein and substantially filling the spacing prior to solidification.

17. The method as defined in claim 15, and further comprising the step of interposing a barrier sheet between the spacing and the coil prior to said filling step to prevent penetration of the flowable material into the coil.

18. The method as defined in claim 15, and further comprising the step of removing the lid from the axial opening and the mandrel from the chamber subsequent to the solidification of the synthetic plastic material to provide access to the inner surface of the coil for peeling the optical fiber therefrom.

* * * * *